United States Patent [19]
Ogino et al.

[11] 3,859,167
[45] Jan. 7, 1975

[54] MICROBIAL PRODUCTION OF BIOTIN

[75] Inventors: Shigeo Ogino, Nishinomiya; Shigehisa Fujimoto, Takarazuka; Hiroo Wada, Takatsuki; Yukio Tanigawa, Toyonaka, all of Japan

[73] Assignee: Sumitomo Chemical Company Ltd., Osaka, Japan

[22] Filed: Mar. 20, 1973

[21] Appl. No.: 343,023

[30] Foreign Application Priority Data
June 13, 1972  Japan.............................. 47-59267
Nov. 24, 1972  Japan............................. 47-118454

[52] U.S. Cl. ............................ 195/51 R, 195/28 R
[51] Int. Cl............................................ C12d 5/00
[58] Field of Search ................................. 195/51 R

[56] References Cited
UNITED STATES PATENTS
3,393,129   7/1968   Shibata et al...................... 195/28 R Primary Examiner—Alvin E. Tanenholtz
Attorney, Agent, or Firm—Wenderoth, Lind & Ponack

[57] ABSTRACT

Process for the production of biotin of the formula:

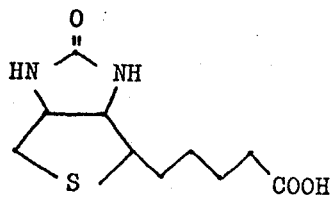

which comprises enzymatically oxidizing a compound of the formula:

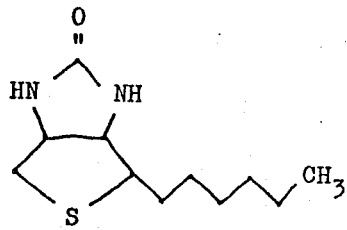

in the presence of a microorganism. Such microorganisms are exemplified by strains belonging to Pseudomonas and Cornybacterium.

18 Claims, No Drawings

MICROBIAL PRODUCTION OF BIOTIN

This invention relates to a process for producing biotin of the formula,

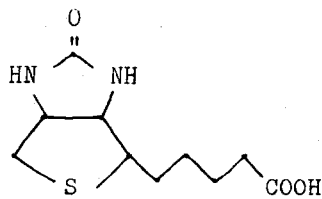

by oxidizing cis-tetrahydro-2-oxo-4-n-pentyl-thieno-3,4-d - imidazoline of the formula,

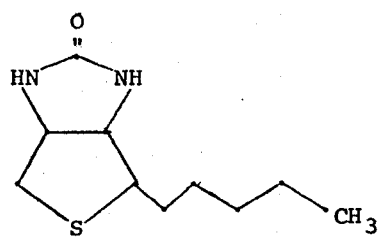

(which will be referred to as A hereinafter) by using a microorganism and more particularly to a process for producing biotin by cultivating a microorganism belonging to the genera Pseudomonas, Corynebacterium, Arthrobacter, Brevibacterium, Mycobacterium, Nocardia, Candida, Cunninghamela, Cladosporium, Gibberella, Penicillium and Mucor in a culture medium containing a proper nutrient and preferably under an aerobic condition, adding the compound A at a proper concentration from the beginning of or after the growth of the microorganism and continuing the cultivation to convert the compound into biotin; or producing biotin from the compound A by using resting cells previously grown in an adequate medium in the presence of absence of a proper amount of the compound A, and then separating biotin from fermented broth or incubated fluids with resting cells.

The advantages of the present invention are that complicated steps of producing biotin required as in the conventional method for the synthesis of biotin can be simplified and that the amount of production of biotin is high (e.g. several grams per liter) as compared with conventional fermentation method wherein the yield of a biotin active substance is at most 20 mg./liter.

As well known, the biotin obtained by the present invention is useful as a feed additive and also in the fermentation industry.

The starting compound A to be used in the present invention is a novel substance, and may be prepared, for example, by the following method.

Thus, for example, the compound A may be obtained by Grignard-reacting N-substituted-cis-tetrahydro-thieno-3,4-d -imidazoline-2,4-dion of the formula,

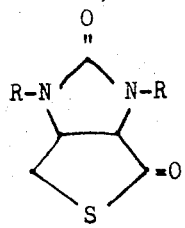

with n-pentyl bromide, then dehydrating and hydrogenating the reaction product and removing the N-substituent.

In carrying out the present invention, the nutrients to be used for the cultivation of the microorganism may be any usual ones which are commonly used for the cultivation of microorganisms. Thus, for the carbon source, for example, n-paraffin, acetic acid, kerosene or combination thereof is preferable although glucose, starch, glycerine or sorbose may be used and, for the nitrogen source, for example, peptone, corn steep liquor, soybean powder, ammonium chloride, ammonium nitrate, ammonium sulfate, urea or mixtures thereof may be used. Further, for the inorganic salt, sodium chloride or a phosphate may be used and, for the traceelements, a sulfate or hydrochloride of magnesium, iron, manganese, cobalt, zinc or copper may be used. The pH of the culture medium may be about 6 to 8, preferably about 7 when a bacteria is used and may be about 4 to 7, preferably about 5 to 6 in the case of using mold or yeast. The cultivation temperature may be about 25 to 37°C., preferably about 25° to 30°C. for bacteria and may be about 22° to 30°C., preferably about 25°C. in the case of yeast or mold. In the culture, aeration and agitation give favorable results.

We have found that in the processs according to the present invention, biotinol is produced as an intermediate before the production of biotin. If the collection of such biotinol is desired, the culture or incubation may be stopped when biotinol is produced.

In carrying out the method of this invention any of the above described microorganisms is grown in a culture medium containing the above mentioned nutrient source. The compound A as dissolved in a proper organic solvent such as ethanol, methanol or dimethyl formamide is added from the beginning of or after the growth of the microorganism and the cultivation is continued for 2 to 7 days. The concentration of the compound A in media may be 0.05 percent to 0.3 percent, preferably 0.1 percent to 0.2 percent.

After the cultivation biotin produced in the culture may be separated and purified. For this purpose a process generally used for extracting a certain product from the culture may be applied by utilizing various properties of biotin. Thus, for example, the cells are removed from the culture fluids, the desired substance in the filtrate is absorbed on active carbon, is then eluted out and is purified with an ion exchange resin. Alternatively the culture filtrate is purified by being treated directly with an ion exchange resin and after the elution the desired product recrystallized from water or alcohol. Further, in some cases, the culture filtrate may be concentrated without using an ion exchange resin and the deposited crystals are collected by adjusting the liquid pH near the isoelectric point.

The microorganisms which can be used in the present invention are those belonging to Pseudomonas, Corynebacterium, Arthrobacter, Brevibacterium, Mycobacterium, Nocardia, Candida, Cunninghamela, Cladosporium, Gibberella, Penicillium and Mucor.

More particular examples of these microorganisms are as follows:

1. Pseudomonas mutabilis B—3252 FERM-P No. 1429 ATCC 31014.
2. Corynebacterium primorioxydans B—321 FERM-P No. 1427 ATCC 31015.
3. Corynebacterium primorioxdans var. forte B—323 FERM-P No. 1428 ATCC 31016.
4. Arthrobacter paraffineus ATCC 21003.
5. Brevibacterium ketoglutamicum ATCC 21004.
6. Mycobacterium smegmatis IFO 3083.

7. Nocardia corallina IFO 1954.
8. Candida arborea IAM 4147.
9. Cunninghamela blakesleeana IFO 4443.
10. Cladosporium herbarum IFO 4458.
11. Gibberella fujikuroi ATCC 14842.
12. Penicillium chrysogenum ATCC 7326.
13. Penicillium patulum ATCC 10120.
14. Mucor microsporus ATCC 8541.

The three strains (1) to (3) above have been newly isolated and identified by us. Their mycological characteristics and identification thereof are as follows. The identification was based on Bergey's Manual of Determinative Bacteriology 7th Edition.

The strain (1) has a polar flagella and forms chains. It is in the shape of a short rod. Therefore this strain belongs to Pseudomonadales. Further, it has no photosynthetic pigment, produces greenish watersoluble pigments, and therefore belongs to Pseudomonadineae. Further it is a short rod, is not attached to a substrate, is oxidative, is sometimes fermentative, attacks glucose oxidatively or fermentatively, does not produce $H_2$ and $CO_2$ and therefore belongs to the Pseudomonas genus. When compared with the characteristics of the Pseudomonas mentioned in Bergey's Manual 7th Edition, it is most similar to Pseudomonas striata. But B—3252 is different in respect that it forms slender rods but is oval and does not become yellowish green or an agar slant. By the way, the description in Bergey's Manual is so little as to be difficult to compare and examine but B—3252 can be said to be different from Pseudomonas striata. Further, as compared with the strains of Iizuka et al. (J. Gen. Appl. Microbial 10 207 ('64) and J. Gen. Appl. Microbial 9 73 ('63)), Ps. nitroreducens, Ps. maltophila and Ps. desmolytica, B—3252 is different from Ps. nitroreducens in respect that no gaseous nitrogen is produced and $H_2S$ is produced and is also different from the pattern of acid production from sugar and OF-test.

It is different also from Ps. maltophila in the growth with a litmus milk or succinate-nitrate solution and is different from Ps. desmolytica in the nitrate production and OF-test.

As in the above, the strain B—3252 can not belong to any of the conventional Ps. genera and is therefore named Ps. mutabilis B—3252.

Each of the two strains (2) and (3) belongs to Eubacteriales II, has not endospore, has had a pleomorphism and branching of cells recognized, has had a snapping division observed and has had club forms recognized. Therefore, each of these strains belongs to Corynebacteriacea. Further it has no peritrichous flagella, is catalase-positive, is gram-positive and therefore belongs to Corynebacterium. Further, in comparing various properties of these strains with those mentioned in Bergey's Manual, it is found that the strain B—321 is most similar to Corynebacterium agrapyri and Corynebacterium facians but is different from the former in the growth with a nutrient broth and acid production from sugar and is different from the latter in the growth with a litmus milk and acid production from sugar. Therefore, this strain B—321 is a strain not mentioned in Bergey's Manual. Further, as compared with the strain of the Corynebacterium genus of Yamada et al. (Agr. Bial. Chem. 27 773 ('63)), it is different in the starch decomposability and OF-test and can not be said to be identical with them. It is different also from Corynebacterium petrophilum of Iguchi et al. (Amino Acid & Nucleic Acid 11 86 ('65)) in the growing temperature, nitrite production, $H_2S$ production and acid production from sugar and is different from Corynebacterium polymorpha of Takahashi et al. (Amino Acid & Nucleic Acid 12 64 ('66)) in the pigment production with bouillon agar, nitrite production, $H_2S$ production, liquefaction of gelatin, state with a litmus milk and starch decomposition. As in the above, B—321 can not belong to the Corynebacterium genus mentioned in the known literatures and is therefore named Corynebacterium primorioxdans B—321. Also B—323 is similar to Corynebacterium renale, Corynebacterium phocae, Corynebacterium agropyri and Corynebacterium facians but is different from Corynebacterium renale in the state with a litmus milk and the optimum temperature, is different from Corynebacterium phocae in the growing temperature in a bouillon, $H_2S$ production and acid production from sugar. It is also different from Corynebacterium agropyri in the growth with a bouillon and acid production from sugar. Further it is different from Corynebacterium facians in the sate with a litmus milk and acid production from sugar, is further different from the above mentioned strain of Yamada et al. mentioned in the literature in the starch decomposition and OF-test, is different from the strains of Iizuka et al. in the $H_2S$ production and OF-test, is different from the strain of Iguchi et al. in the growing temperature, nitrite production, $H_2S$ production and acid production from sugar and is different from the strain of Takahashi et al. in the growth in nitrient agar, nitrite production, $H_2S$ production, growth with gelatin, growth with a litmus milk and starch decomposition. Therefore, B—323 can not belong to the conventional Corynebacterium, is different from B—321 in the acid production and is therefore named Corynebacterium primorioxydans var. forte.

The mycological characteristics of the strains B—321, B—323 and B—3252 are as follows:

|  |  | B-321 | B-323 | B-3252 |
|---|---|---|---|---|
| Morphological characteristics | Form | Spheres to short rods | Short rod | Short rods |
|  | Size | 0.8-1.0μ × 1.4-1.7μ | 0.8-1.0μ × 1.4-1.7μ | 0.8-1.0μ × 1.4-1.7μ |
|  | Motility | Non-motile | Non-motile | Motile |
|  | Flagella | Absent | Absent | Multi-trichous flagella |
|  | Gram-stain | Positive | Positive | Negative |
|  | Acid-fast stain | Negative | Negative | Negative |
|  | Form | Circular | Circular | Circular |
|  | Surface | Smooth | Smooth | Smooth |

—Continued

| | | B-321 | B-323 | B-3252 |
|---|---|---|---|---|
| Agar colony | Edge | Entire | Entire | Entire |
| | Elevation | Convex | Convex | Convex |
| | Color | White to pale orange | White to pale orange | Pale brown |
| | Luster | Glistening | Glistening | Glistening |
| | Optical | Opaque | Opaque | Fluorescent |
| Agar Slant | Growth | Abundant | Abundant | Abundant |
| | Form | Filiform | Filiform | Filiform |
| | Luster | Glistening | Glistening | Glistening |
| | Color | White to pale orange | White to pale orange | Pale yellowish brown |
| | Consistency | Butyrous | Butyrous | Butyrous |
| Nutrient broth | Surface growth | Fragile pellicle | Fragile pellicle | Pellicle |
| | Clouding | Turbid | Turbid | Strongly turbid |
| | Sediment | Abundant | Abundant | Abundant |
| Gelatin stab | Growth | Scant | Scant | Good |
| | Liquefaction | None | None | None |
| Litmus milk | | Unchanged Slightly reduced | Unchanged Slightly reduced | Unchanged Slightly reduced |
| Action on nitrate | | Nitrite but no gas | Nitrite but no gas | Nitrite but no gas |
| Hydrogen sulfide | | Positive | Positive | Positive |
| Indole production | | Negative | Negative | Negative |
| V.P. test | | Negative | Negative | Negative |
| Hydrolysis of starch | | Negative | Negative | Negative |
| Ceavage of glucose according to Hugh & Leifson's method | Aerobic | Acid but no gas | Acid but no gas | Acid but no gas |
| | Anaerobic | Acid but no gas | Acid but no gas | Acid but no gas |
| Catalase | | Positive | Positive | Positive |
| Urease | | Positive | Positive | Positive |
| Relation with pH | | pH 5-10, no growth at pH 4.0 | pH 6-10, no growth at pH 5.0 | pH 5-10, no growth at pH 4.0 |
| Methyl red test | | Positive | Negative | Negative |
| Ceavage of sugar in liquid culture | Arabinose | No acid no gas | No acid no gas | No acid no gas |
| | Xylose | do. | do. | do. |
| | Glucose | do. | Acid no gas | Acid no gas |
| | Mannose | do. | No acid no gas | No acid no gas |
| | Fructose | do. | do. | do. |
| | Galactose | Acid no gas | Acid no gas | Acid no gas |
| | Maltose | No acid no gas | No acid no gas | No acid no gas |
| | Sucrose | do. | do. | do. |
| | Lactose | do. | do. | do. |
| | Trehalose | do. | do. | do. |
| | Sorbitol | do. | do. | do. |
| | Mannitol | do. | do. | do. |
| | Inositol | No acid no gas | No acid no gas | No acid no gas |
| | Glycerol | do. | do. | do. |
| | Starch | do. | do. | do. |
| | Rhamnose | do. | do. | do. |
| | Inulin | do. | do. | do. |
| | Glycogen | do. | do. | do. |
| | Dextrin | do. | do. | do. |
| | No sugar | do. | do. | do. |

The present invention will be explained in more detail by referring to the following Examples. However, it should be understood that the present invention is not limited to these particular examples.

EXAMPLE 1

100 ml. of a liquid culture medium (pH 6.0) containing 2 percent n-paraffin, 0.35 percent sodium hydrogenphosphate, 0.25 percent potassium dihydrogenphosphate, 0.1 percent magnesium sulfate, 0.01 percent sodium chloride, 0.01 percent C.S.L. and 0.2 percent urea was poured into each of 10 Sakaguchi flasks of a capacity of 500 ml. After sterilization 2 percent of Corynebacterium primorioxydans B—321 FERM-P 1427 which had been cultured in advance in a culture medium of the same composition was inoculated and then cultivated at 30°C. on a reciprocal shaker for 24 hours. Then 2 ml. of an ethanol solution of the compound A (50 mg./ml.) were added into each of these flasks and the cultivation was further continued at 30°C. for 5 days. After the completion of the cultivation the culture broth was separated into cells and filtrate with a centrifuge. The cells were washed with distilled water and the filtrate and washing liquid were combined together and the pH was adjusted to 3.0. Then 2 percent active carbon was added to absorb the produced biotin, while agitating the liquid. The active carbon was collected by filtration and then subjected to elution with 50 percent ammonia alkaline ethanol. The solvent was distilled away to obtain 1.45 g. of a residue. Then this residue was dissolved in weakly alkaline water, was adsorbed on a column (3 × 150 cm.) of Dowex 1 × 2 (formate type). Then the column was washed with water and was then subjected to elution with 0.01 M formic acid. The biotin-containing fraction was concentrated under a reduced pressure to obtain 0.85 g. of crude crystals. It was recrystallized from water to obtain 0.80 g. of biotin having a melting point of 232°C. The infrared absorption and NMR spectrum of this product coincided with those of a standard product.

EXAMPLE 2

Corynebacterium primorioxydans var. forte B—323 FERM-P 1428 cultivated and the resulting culture broth was treated in the same manner as in Example 1 to obtain 0.85 g. of biotin. This product coincided with the standard product in the infrared absorption and NMR spectrum.

EXAMPLE 3

100 ml. of a culture medium of the same composition as was used in Example 1 were poured into a Sakaguchi flask of a capacity of 500 ml. After sterilization 2 percent of Pseudomonas mutabilis B—3252 FERM-P 1429 which had been cultured in advance in a culture medium of the same composition was inoculated and cultivated at 25°C. in a reciprocal shaker for 24 hours. Then 2 ml. of an ethanol solution of the compound A (50 mg./ml.) were added to the culture medium and the cultivation was further conducted at 25°C. for 5 days. After the completion of the cultivation, the culture broth was treated in the same manner as in Example 1 to obtain 73 mg. of biotin. This product coincided with the standard product in the infrared absorption.

EXAMPLE 4

Nocardia corallina LFO 1954 was cultivated and the resulting culture broth was treated in the same manner as in Example 1 to obtain 0.56 g. of biotin (m.p. 232°C.). The infrared absorption spectrum of this product coincided with that of the standard product.

EXAMPLE 5

Mycobacterium smegmatis IFO 3083 was cultivated and the resulting culture broth was treated in the same manner as in Example 1 to obtain 0.40 g. of biotin. This product coincided with the standard product in the infrared absorption.

EXAMPLE 6

100 ml. of a liquid culture medium (pH 7.0) containing 2 percent paraffin, 0.35 percent sodium hydrogenphosphate, 0.25 percent potassium dihydrogenphosphate, 0.10 percent magnesium sulfate, 0.01 percent sodium chloride salt, 0.01 percent calcium chloride, 8 mg./liter of zinc sulfate, 8 mg./liter of manganese sulfate, 10 mg./liter of ferrous sulfate, 40 mg./liter of copper sulfate, 0.01 percent C.S.L. and 0.2 percent urea were poured into each of 10 Sakaguchi flasks of a capacity of 500 ml. and were sterlized. Then 2 percent of Arthrobacter paraffineus ATCC 21003 cultured in advance in a culture medium of the same composition was inoculated and the cultivation was conducted at 30°C. in a reciprocal shaker for 2 days. Then 2 ml. of an ethanol solution of the compound A (50 mg./ml.) were added into each flask and the cultivation was further conducted at 30°C. for 5 days. After the completion of the cultivation, the culture broth was treated in the same manner as in Example 1 to obtain 0.72 g. of biotin. The infrared absorption spectrum and NMR spectrum of this product coincided with those of the standard product.

EXAMPLE 7

Brevibacterium ketoglutamicum ATCC 21004 was cultivated and the resulting culture broth was treated in the same manner as in Example 6 to obtain 0.35 g. of biotin. The infrared absorption spectrum of this product coincided with that of the standard product.

EXAMPLE 8

100 ml. of a liquid culture medium containing of 5 percent n-paraffin, 0.5 percent ammonium chloride, 0.34 percent sodium hydrogen phosphate, 0.16 percent potassium dihydrogenphosphate, 0.05 percent magnesium sulfate, 0.05 percent sodium chloride and 0.01 percent C.S.L. were poured into a Sakaguchi flask of a capacity of 500 ml. After sterilization 2 percent of Candida arborea IAM 4147 cultured in advance in a culture medium of the same composition was inoculated and cultivated at 27°C. After about 20 hours, 5.0 ml. of an ethanol solution of the compound A (50 mg./ml.) were added and the cultivation was contained for 5 days. Then, the resulting culture broth was treated in the same manner as in Example 1 to obtain 162 mg. of biotin. The infrared absorption spectrum and NMR spectrum of this product coincided with those of the standard product.

EXAMPLE 9

100 ml. of a liquid culture medium containing 5 percent n-paraffin, 0.1 percent malt extract, 0.2 percent ammonium sulfate, 0.4 percent potassium dihydrogenphosphate, 0.6 percent sodium hydrogenphosphate, 0.02 percent magnesium sulfate, 1.0 mg./liter of ferrous sulfate, 10 mg./liter of boric acid, 10 mg./liter of manganese sulfate, 70 mg./liter of zinc sulfate and 50 mg./liter of copper sulfate were put into a Sakaguchi flask of a capacity of 500 ml. After sterilization Cunninghamella blakesleeana IFO 4443 cultured in advance in a culture medium of the same composition was inoculated and was cultivated at 25°C. for 3 days. Then 5.0 ml. of an ethanol solution of the compound A (50 mg./ml.) were added and the cultivation was continued for 7 days. Then the produced biotin was isolated and purified in the same manner as in Example 1 to obtain 140 mg. of crystals. This product coincided with the standard biotin in the infrared absorption.

EXAMPLE 10

By the same procedure as in Example 9 except that Gibberella fujikuroi ATCC 14842 was used, 155 mg. of biotin were obtained. The infrared absorption spectrum of this product coincided with that of the standard product.

EXAMPLE 11

By the same procedure as in Example 9 except that Penicillium Chrysogenum IAM 7326 was used, 112 mg. of biotin were obtained. This product coincided with the standard product in the infrared absorption.

EXAMPLE 12

500 mg. of resting cells of Corynebacterium primorioxydans B—321 cultured in a culture medium of the same composition as in Example 1 were suspended in 10 ml. of 0.05 M of phosphate buffer (pH 7.0). Then 0.2 ml. of an ethanol solution of the compound A (50 mg./ml.) was added to the suspension and the suspension was incubated overnight at 28°C. in a Monod shaker. Then the cells were removed by centrifugation, the supernatant liquid was concentrated. The desired product was separated therefrom and purified by means of a thin layer chromatography (benzene/methanol/acetone/acetic acid of 7/2/0.5/0.5) to obtain 3.5 mg. of biotin. This product coincided with the standard product in the infrared absorption by a KBr tablet method.

EXAMPLE 13

Cells of Arthrobacter paraffineus ATCC 21003 obtained by culturing it in a culture medium of the same composition as was mentioned in Example 6 were frozen and dried. Then 200 mg. of the cells were suspended in 10 ml. of 0.05 M of phosphate buffer (pH 7.0). Then 0.2 ml. of an ethanol solution of the compound A (50 mg./ml.) was added to the suspension and the suspension was incubated overnight at 26°C. while being shaken with a reciprocal shaker. Then the cells were treated in the same manner as in Example 12, 3.0 mg. of biotin were obtained. The infrared absorption spectrum of this product coincided with that of the standard product.

What is claimed is:

1. A process of causing the microbiological transformation of a compound A having the following formula:

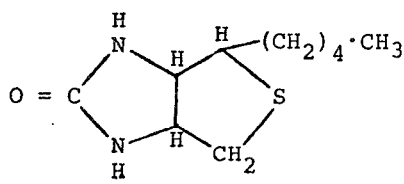

which comprises enzymatically oxidizing the said compound A to obtain biotin in the presence of a microorganism selected from the group consisting of those belonging to Pseudomonas, Corynebacterium, Arthrobacter, Brevibacterium, Mycobacterium, Nocardia, Candida, Cunninghamella, Cladosporium, Gibberella, Penicillium and Mucor which are capable of oxiding the compound A.

2. A method according to claim 1, wherein transformation of a compound A to biotin is carried out by growing cells of a microorganism cultured in a medium at a pH value of 6.5–9.0 and containing assimilable carbon sources, nitrogen sources and other nutrients necessary for the growth of the microorganism at a temperature of 25°C–40°C under aerobic condition.

3. A method according to claim 1, wherein transformation of compound A to biotin is carried out by resting cells of a microorganism previously grown in a medium at a pH value 6.5–9.0 and containing assimilable carbon sources, nitrogen sources and other nutrients necessary for the growth of the microorganism at a temperature of 25°C–40°C under aerobic condition.

4. A method according to claim 1, wherein the microorganism is a strain selected from the group consisting of Corynebacterium primorioxydans ATCC 31015, Corynebacterium primorioxydans var. forte ATCC 31016, Pseudomonas mutabilis ATCC 31014, Arthrobacter paraffineous ATCC 21003, Brevibacterium ketoglutamicum ATCC 21004, Mycobacterium smegmatis IFO 3083, Nocardia corallina IFO 1954, Candida arborea IAM 4147, Cunninghamella blakesleeana IFO 4443, Cladosporium herbarum IFO 4458, Gibberella fujikuroi ATCC 14842, Penicillium chrysogenum ATCC 7326, Penicillium patulum ATCC 10120, and Mucor microsporus ATCC 8541.

5. A method according to claim 1, wherein the microorganism is Corynebacterium primorioxydans ATCC 31015.

6. A method according to claim 1, wherein the microorganism is Corynebacterium primorioxydans var. forte ATCC 31016.

7. A method according to claim 1, wherein the microorganism is Pseudomonas mutabilis ATCC 31016 31014.

8. A method according to claim 1, wherein the concentration of compound A is 0.05 – 0.3 percent.

9. A method according to claim 1 wherein the microorganism is Arthrobacter paraffineous ATCC 21003.

10. A method according to claim 1 wherein the microorganism is Brevibacterium ketoglutamicum ATCC 21004.

11. A method according to claim 1 wherein the microorganism is Mycobacterium smegmatis IFO 3083.

12. A method according to claim 1 wherein the microorganism is Candida arborea IAM 4147.

13. A method according to claim 1 wherein the microorganism is Cunninghamella blakesleeana IFO 4443.

14. A method according to claim 1 wherein the microorganism is Cladosporium herbarum IFO 4458.

15. A method according to claim 1 wherein the microorganism is Gibberella fujikuroi ATCC 14842.

16. A method according to claim 1 wherein the microorganism is Penicillium chrysogenum ATCC 7326.

17. A method according to claim 1 wherein the microorganism is Penicillium patulum ATCC 10120.

18. A method according to claim 1 wherein the microorganism is Mucor microsporus ATCC 8541.